(12) United States Patent
Meisen

(10) Patent No.: US 6,508,290 B2
(45) Date of Patent: *Jan. 21, 2003

(54) METHOD OF PREPARING AN ALUMINUM-CONTAINING IRON OXIDE NUCLEUS

(75) Inventor: Ulrich Meisen, Kall (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/945,481

(22) Filed: Aug. 31, 2001

(65) Prior Publication Data

US 2002/0127176 A1 Sep. 12, 2002

(30) Foreign Application Priority Data

Sep. 7, 2000 (DE) .......................... 100 44 097

(51) Int. Cl.$^7$ .................................................. B65C 9/04
(52) U.S. Cl. .................. 156/456; 106/404; 106/418; 106/439; 106/442; 106/474; 423/632
(58) Field of Search ................ 106/404, 418, 106/439, 442, 456, 474; 423/436

(56) References Cited

U.S. PATENT DOCUMENTS

| | | | | | |
|---|---|---|---|---|---|
| 4,618,375 | A | * | 10/1986 | Patil et al. .................. | 106/404 |
| 4,620,879 | A | | 11/1986 | Burow et al. ................ | 106/304 |
| 5,916,360 | A | * | 6/1999 | Braun et al. ................. | 106/456 |
| 6,042,642 | A | * | 3/2000 | Braun et al. ................. | 106/456 |
| 6,053,972 | A | * | 4/2000 | Pitzer et al. ................. | 106/456 |
| 6,179,908 | B1 | * | 1/2001 | Braun et al. ................. | 106/456 |

FOREIGN PATENT DOCUMENTS

| | | |
|---|---|---|
| EP | 0 842 901 A1 | 5/1998 |
| EP | 0 982 377 A1 | 3/2000 |

* cited by examiner

*Primary Examiner*—Mark L. Bell
*Assistant Examiner*—Shalie Manlove
(74) *Attorney, Agent, or Firm*—Joseph C. Gil; Thomas W. Roy

(57) ABSTRACT

The invention relates to a method of preparing an aluminium-containing iron oxide nucleus with an α-FeOOH crystal structure from $FeCl_2$. This nucleus is a suitable starting material for the preparation of iron oxide yellow and for use as a yellow coloring pigment.

11 Claims, No Drawings

METHOD OF PREPARING AN ALUMINUM-CONTAINING IRON OXIDE NUCLEUS

BACKGROUND OF THE INVENTION

The invention relates to a method of preparing an aluminium-containing iron oxide nucleus with an α-FeOOH crystal structure from $FeCl_2$. This nucleus is a suitable starting material for the preparation of iron oxide yellow and for use as a yellow coloring pigment.

Synthetic iron oxides are usually prepared by the Laux method, the Penniman method, the precipitation method, the neutralisation method or the roasting method (Ullmann's Encyclopedia of Industrial Chemistry, $5^{th}$ edition, 1992, Vol. A20, pages 297 et seq.). The iron oxides thus obtained are generally employed as pigments.

Basically two processes are known for preparing fine-particle α-FeOOH (needle width between 5 and 30 nm):

the acid process and the alkaline process.

In the acid process an iron (II) component, an iron salt dissolved in water, is introduced initially and an alkaline component is added to it in metered quantities and with intensive mixing; the alkaline component is generally an alkali metal or alkaline earth metal compound dissolved or suspended in water or an ammonia solution. The quantity of alkaline component added is generally between 15% and 70% of the stoichiometrically required quantity. The pH after its addition is within the slightly acid range.

When the addition of the alkaline component is over the material is oxidized with an oxidant, usually atmospheric oxygen. The reaction is carried out at temperatures between 20 and 50° C. At considerably higher temperatures there is a danger of undesirable magnetite forming. The end of the reaction can be recognized by a sharp drop in pH and redox potential. When the reaction is over the properties of the product obtained (generally described as the nucleus) are determined and the product—if suitable—is processed immediately to form an α-FeOOH pigment.

The alkaline process differs from the acid process in the quantity of alkaline component. In the alkaline process it is at least about 120% of the stoichiometrically required quantity and generally considerably more. The temperatures at which the reaction is carried out may be slightly above those used in the acid process as there is less danger here of magnetite forming.

The alkaline process basically produces relatively long-needled α-FeOOH crystallites with a length to width ratio of 10:1 to 30:1. As these crystallites also contain very few dendrites the process is particularly suitable for preparing α-FeOOH as a starting material for magnetic tapes.

Nuclei prepared by the alkaline process cannot be employed directly—or only to a limited extent—for making (α-FeOOH pigments for use in paints and lacquers, as all the other coloring metals present in the industrially used Fe component become incorporated during the process. These metals (particularly Mn, Cr, Cu, Ni) have a considerably adverse effect on color properties, thereby restricting the use of nuclei thus prepared for the production of coloring pigments.

In the preparation of iron oxide pigments it is preferable to start with an α-FeOOH nucleus and then to coarsen it (build it up) in the acid substance, thereby diminishing the introduction of coloring metals. Furthermore the build-up must only take place at pH levels below about 4, as coloring metals are introduced to an increasing extent at higher pH levels. Moreover, the particle shape of the (α-FeOOH considerably affects the color properties, the viscosity of the lacquer and the requirements for the binder.

Short-needle α-FeOOH particles are necessary in order to obtain the desired low viscosity in the lacquer and little binder requirements. These can be made by intensively grinding long-needle α-FeOOH particles. A more favourably priced alternative is direct preparation of short-needle α-FeOOH particles.

Modifying additives are required in order to guide the particle shape of the α-FeOOH nucleus and thus that of the pigment built up therefrom towards a low length to width ratio. The use of B, Al, Ga, Si, Ge, Sn or Pb as nucleus modifiers is known from U.S. Pat. No. 4,620,879. This patent specification describes an iron oxide yellow with a particularly low Silking index, achieved through an appropriate pigment build-up procedure and addition of the modifiers listed above. Although the specification describes the use of $FeCl_2$ it does not mention the exact conditions for preparing an (α-FeOOH nucleus from $FeCl_2$. However since $FeCl_2$ clearly differs from $FeSO_4$, especially in the nucleus-forming phase, the conditions under which a good pigment is obtained with $FeSO_4$ cannot be transferred to $FeCl_2$.

An object of the invention was to provide a method of preparing a short-needle α-FeOOH nucleus by the precipitation process in a simple and cost-effective way. In a further step the α-FeOOH nucleus is built up to form an α-FeOOH pigment.

The object is solved by the method of the invention.

SUMMARY OF THE INVENTION

The invention relates to a method of preparing aluminium-containing iron oxide nuclei with an α-FeOOH crystal structure with an aspect ratio (AR) of 2100 to 3600 and a BET surface area of 50 to 150 m2/g using $FeCl_2$, comprising the steps of a) initially adding 4–13 mol %, based on the total iron, of an Al component to an iron (II) chloride solution with a total Fe content of 20–100 g/l, and an Fe (III) content of 0.1 to 10 mol % Fe (III) (based on the total Fe)

b) heating the mixture to a precipitation temperature between 30 and 60° C., c) adding a precipitating agent with an active ingredient content of 2–10 equivalents per liter, to the mixture and the molar ratio of Fe+Al to precipitating agent is 20–80% of the stoichiometric quantity, d) oxidizing the precipitated suspension by an oxidant at a speed such that the oxidation rate is 2–50 mol %/h of the iron to be oxidized.

DETAILED DESCRIPTION OF THE INVENTION

In the context of the present invention the aspect ratio is the product of the BET surface area and the mean crystallite size, determined from the 110 reflex of the α-FeOOH by X-ray crystallography.

The Al-containing α-FeOOH nucleus obtained after oxidation may optionally by used to prepare iron oxide yellow pigments without further separation, when its properties have been tested.

The process preferably uses a) an iron (II) chloride solution with a total Fe content of preferably 40–65 g/l, b) a precipitation temperature between 35 and 50° C., c) a precipitating agent with an active ingredient content of 4–8 equivalents per liter, c) a molar ratio of Fe+Al to precipitating agent of 30–60% of the stoichiometric quantity, and The Al-containing α-FeOOH nucleus obtained after oxidation is separated if appropriate.

It is more preferred to proceed as follows:

Initial chemicals:
  $FeCl_2$ solution with an Fe content of 55 g/l Fe, including 1.5 mol % Fe (III)
  $AlCl_3$ solution
  NaOH solution with an NaOH content of 300 g/l=7.5 equivalents NaOH/l
  Al/Fe ratio: 12–13
  Proportion of Fe+Al/precipitating agent: 35–40%

Reaction conditions:
  Temperature: 44° C.
  Oxidation speed: 30–35 mol % Fe (II)/h $AlCl_3$ (as an aqueous solution) is preferably employed as the Al component. The use of Si or Ti as nucleus modifiers, in their chloride form, is also possible but entails a greater industrial outlay on production.

NaOH, KOH, $Na_2CO_3$, $K_2CO_3$, $Mg(OH)_2$, MgO, $MgCO_3$, $Ca(OH)_2$, CaO, $CaCO_3$, $NH_3$ or secondary or tertiary aliphatic amines may be used as precipitating agents in an aqueous solution or an aqueous slurry.

The oxidant used may be atmospheric oxygen, oxygen, ozone, $H_2O_2$, chlorine, nitrates of alkali metals or alkaline earth metals or $NH_4NO_3$.

If the iron (II) chloride solution employed contains quite large quantities of precipitable coloring metals at pH levels below 4, these may be precipitated by adding an alkaline component to the iron (II) chloride solution up to pH 4. The solid formed may be separated from the remaining clear, purified solution by sedimentation, filtering or centrifuging. Not only are the undesirable coloring metals removed but also Fe (III), which has a seriously undesirable effect on the reaction to form the α-FeOOH nucleus (it forms black magnetite).

The reaction takes place in discontinuous or continuous agitating boilers, in cascades of agitating boilers, loop-type reactors or reactors without agitators and with dual-material nozzles as mixing members.

When the α-FeOOH nuclei according to the invention have been prepared they are converted to a pigment by the known process of coarsening the nucleus particles (building up the pigment). But as the α-FeOOH nuclei according to the invention are not used as such it is necessary to describe how the pigment is built up to form an iron oxide yellow pigment.

The Al-containing nucleus prepared by the method of the invention is pumped to a solution of $FeCl_2$ or $FeSO_4$ or a different Fe (II) salt. 7–15 mol Fe (II) salt, as a solution with an Fe content of 30–100 g/l Fe, is used per mol of FeOOH in the nucleus. Addition of larger quantities of Fe (II) salt does also produce α-FeOOH yellow pigments but the brightness diminishes as the quantity of added Fe (II) salts is increased, which is generally undesirable. The suspension is heated to the reaction temperature, which is between 50 and 90° C. When the precipitation temperature has been reached oxidation and precipitation are started simultaneously. Atmospheric oxygen is generally added through a suitable gas supplying device and the pH of the suspension is adjusted with an alkaline precipitating agent. The pH is adjusted within the 2.4 to 4.8 range. The oxidation speed should be between 0.5 and 8 mol % Fe (III)/h.

When the reaction is over (i.e. when all the Fe (II) has been oxidized) the solid formed is filtered off. It is washed to remove the salt and can then be dried.

The yellow pigment made by this method is distinctive in its very pure color, almost isometric particle shape, low oil absorption number and high chemical purity. The sum of its properties makes it particularly suitable for:

application in the field of paints and lacquers
  applications as a raw material for catalysts
  applications in the food coloring field
  applications in the paper coloring field
  applications in the polymer coloring field
  applications as a UV stabiliser
  applications in the field of high-grade building materials (plasters etc)
  applications in the field of dispersion colors Due to the cost-effective raw materials and the high production rate in preparing the yellow pigment the process is particularly economical. Due to the special reaction process and use of a precisely specified nucleus one can prepare especially high-grade yellow pigments which are more advantageous to use than pigments made by other methods.

Environmentally relevant chemicals are not employed in preparing the yellow pigments according to the invention.

In the preferred embodiment (with $FeCl_2$, $AlCl_3$, NaOH and air used as the ingredients) an almost closed circuit is possible through electrolysis of the NaCl obtained as a by-product. The resultant sodium hydroxide solution may be re-used directly in the process. The $H_2$ and $Cl_2$ produced by the chlor-alkali electrolysis can be converted to HCl, which can in turn be used for etching the steel plates. This particularly environmentally friendly technology is not at present possible with $FeSO_4$ as electrolysis of $FeSO_4$ does not work satisfactorily.

Description of the Measuring Methods Used

1. Measuring the BET Surface Area

The BET surface area is determined by the so-called one point method to DIN 66131. 90% He and 10% $N_2$ are used as the gas mixture and the measurement is taken at 77.4 K. The sample is heated for 60 minutes at 140° C. before measuring.

2. Radiographic Measurement of the Crystallite Size

The crystallite size is determined on the Phillips powder diffractometer. The 110 reflex is used for this purpose. α-iron oxide hydroxide (M(FeOOH)=88.9 g/mol 2.1 Field of Application Determining crystallite size in goethite within the 5 to 100 nm range.

2.2 Basic Method

The size in goethite is determined after X-ray diffractometric radiation through reflection detection. The evaluation is made using silicon as an external standard.

2.3 The Reagent

Silicon standard for angular calibration (ICDD no. 27-1402), Philips PW 1062/20

| 3. | Apparatus | |
|---|---|---|
| 3.4.1 | Diffractometer: | Philips PW 1800 goniometer |
| 3.4.2 | Sample feed: | 21 times sampler changer |
| 3.4.3 | Detector: | Xe proportional counting tube |
| 3.4.4 | Reflex evaluation: | X-Pert software Rev. 1.2 on HP Vectra VL |
| 3.4.5 | Agate pestle and mortar | |
| 3.4.6 | Sample carrier | Philips PW1811/00 and PW18111/27 |
| 3.5 | Conditions for X-ray diffractometry | |

-continued

| | | |
|---|---|---|
| 3.5.1 | X-ray tube: | Long fine focus, Cu anode, 60 kV, 2200 W |
| 3.5.2 | Radiation: | CuK$\alpha_1$: $\lambda$ = 0.154056 nm |
| 3.5.3 | Generator: | 40 kV, 40 mA |
| 3.5.4 | Scan parameters: | |
| 3.5.4.1 | Scan type: | Step scan |
| 3.5.4.2 | Step size | 0.020° 2theta |
| 3.5.4.3 | Step measuring time | 2.00 s |
| 3.5.5 | Silicon standard | |
| 3.5.5.1 | Starting angle: | 27.00° 2theta |
| 3.5.5.2. | Final angle: | 30.00° 2theta |
| 3.5.6 | Sample: | |
| 3.5.6.1 | Starting angle: | 18.50° 2theta |
| 3.5.6.2 | Final angle: | 23.50° 2theta |
| 3.6 | Procedure | |
| 3.6.1 | External standard: | |
| 3.6.1.1 | Place silicon standard (2.1) in the sample carrier of the diffractometer | |
| 3.6.1.2 | Determine the maximum and the half-intensity width of the silicon reflex with Miller indices hkl = 111 in the 2theta angle range from 27.00° to 30.00°. Print out the peak parameters (Table 1) and, if appropriate, the diffractogram. | |
| 3.6.2 | Determination in the sample: | |
| 3.6.2.1 | Grind about 2 g of the sample in the agate mortar (4.5). | |
| 3.6.2.2 | Place about 1 g of the sample in the sample carrier (4.6) of the diffractometer and start the measuring program. | |
| 3.6.2.3 | Determine the maximum and the integral width of the goethite reflex with Miller indices hkl = 110 in the 2theta angle range from 18.50° to 23.50°. Print out the peak parameters (Table 2) and, optionally, the diffractogram. | |
| 3.7 | Calculations | |
| 3.7.1 | Enter the integral width (width of broadened profile), the maximum (peak position/°2theta) of the goethite reflex and the reflex half intensity width (width of standard profile/FWHM) of the silicon standard in the crystallite size determination table displayed on the computer (X'Pert software, Rev. 1.2 (Philips Analytical computer (X'Pert software, Rev. 1.2 (Philips Analytical GmbH, Kassel, Germany, Profile Widths). Produce and print the evaluation record. | |
| 3.7.2 | Crystallite size is determined in the X'Pert program the Scherrer equation: | |

$D_{(crystallite\ size)} = k\lambda/W_{size} \cos\theta$

| | |
|---|---|
| $D_{(crystallite\ size)}$ | Crystallite size in nm |
| k | Shape factor of crystallites = 0.9 (average from literature) |
| $\lambda$ | Wavelength in nm |
| $W_{size}$ | Integral width of goethite reflex - reflex half intensity width of silicon standard |
| $\cos\theta$ | Maximum of goethite reflex in °2theta |

TABLE 1

Peak parameters of silicon reflex

| Parameters | | |
|---|---|---|
| Position, top value, (°2theta) | | 28.45746 |
| Net height (counts) | | 8588.32 |
| Background height at peak position (counts) | | 66.56 |
| Net area (°2theta * counts) | | 1182 |
| Background area (°2theta * counts) | | 200 |
| FWHM (°2theta) | | 0.0976 |
| Integral breadth (°2theta) | | 0.1376 |
| FWHM/integral breadth | | 0.7094 |
| Asymmetry | | 0.99 |
| Background | | |
| Low angle side | (°2theta) | 27.02000 |
| | (counts) | 61.58 |

TABLE 1-continued

| High angle side | (°2theta) | 29.98000 |
|---|---|---|
| | (counts) | 71.75 |

TABLE 2

Peak parameters of goethite
sample: Crystallite size 46.5 nm

| | | |
|---|---|---|
| Position, top value, (°2theta) | | 21.25219 |
| Net height (counts) | | 2120.73 |
| Background height at peak position (counts) | | 44.92 |
| Net area (°2theta * counts) | | 589 |
| Background area (°2theta * counts) | | 237 |
| FWHM (°2theta) | | 0.2061 |
| Integral breadth (°2theta) | | 0.2779 |
| FWHM/integral breadth | | 0.7415 |
| Asymmetry | | 1.16 |
| Background | | |
| Low angle side | (°2theta) | 18.54000 |
| | (counts) | 58.38 |
| High angle side | (°2theta) | 23.67000 |
| | (counts) | 33.05 |

TABLE 3

Crystallite size determination with X'Pert program: Scherrer equation
Menu option: Additional functions in X'Pert program section:
X'Pert organiser
Anode material Cu (copper)
Radiation type Cu K$\alpha$
Wavelength (nm) 0.154184
K factor (mean shape factor) 0.9000
CuK$\alpha_1$/CuK$\alpha_2$ intensity ratio 0.5000

| Signal width of broadening (°2theta) | Signal breadth (°2theta) | Particle Size broadening (°2theta) | Lattice tension broadening (°2theta) | Signal position (°2theta) | Crystallite size (nm) |
|---|---|---|---|---|---|
| 0.1376 | 0.0976 | 0.0400 | 0.0970 | 28.45500 | 205.1 |
| 0.2779 | 0.0976 | 0.1803 | 0.2602 | 21.25400 | 44.9 |
| 0.2766 | 0.0976 | 0.1790 | 0.2588 | 21.25100 | 45.2 |
| 0.8814 | 0.0976 | 0.7838 | 0.8760 | 21.22800 | 10.3 |
| 0.9325 | 0.0976 | 0.8349 | 0.9274 | 21.24400 | 9.7 |
| 0.4287 | 0.0976 | 0.3311 | 0.4174 | 21.22090 | 24.4 |
| 0.4274 | 0.0976 | 0.3298 | 0.4161 | 21.21911 | 24.5 |

4. Measurement of color values
Color values are measured as described in EP-A 0 911 370.

EXAMPLES

Example 1

Aluminium-containing Nucleus of $FeCl_2$ and $AlCl_3$ 14.095 liters of $FeCl_2$ solution with 55.07 g/l Fe and an Fe (III) content of 1.5 mol % (relative to total Fe) was placed in a discontinuous agitating boiler with a useful volume of 30 liter, equipped with a three-stage cross-arm agitator and a gas supply device (a ring with holes below the agitator). 914g of $AlCl_3$ solution with 5.06% by weight of Al and 3.95% of HCl was then added.

The quantity of $FeCl_2$ corresponded to 13.9 mol Fe (Fe (II) and Fe (III)), the quantity of $AlCl_3$ to 1.71 mol and that of HCl to 0.989 mol. The Al/total Fe ratio accordingly corresponded to 12.3 mol % relative to total Fe. This solution was heated to 44° C. with agitation and with nitrogen supplied at 300 Nl/h. When this temperature had been reached 1615 ml of soda lye containing 300 g NaOH/l (corresponding to 7.5 equivalents per liter) was pumped in with a gear pump in 6 minutes. 33.8% of the metals Fe+Al were therefore precipitated. As soon as the precipitation was over the supply of nitrogen was stopped and 97 Nl/h of air was supplied for oxidation. The reaction was terminated 180 minutes after the beginning of oxidation. The oxidation speed was accordingly 33.3 mol % Fe (II)/h. (This took into account only the 33.8% of the Fe which was precipitated by the NaOH. The Fe (III) part was counted as Fe (II). It was also assumed that Fe and Al were precipitated equally).

The nucleus obtained had the following properties:
BET surface area: 100 m$^2$/g
Crystallite size: 27.0 nm
AR: 2700
(AR=BET surface area multiplied with crystallite size)

Comparative Example 1

Aluminium-containing Nucleus of FeCl$_2$ and AlCl$_3$ 14.095 liters of FeCl$_2$ solution with 55.07 g/l Fe and an Fe (III) content of 1.5 mol % (relative to total Fe) is placed in a discontinuous agitating boiler with a useful volume of 30 liter, equipped with a three-stage cross-arm agitator and a gas supply device (a ring with holes below the agitator). 914g of AlCl$_3$ solution with 5.06% by weight of Al and 3.95% of HCl is then added.

The quantity of FeCl$_2$ corresponds to 13.9 mol Fe (Fe (II) and Fe (III)), the quantity of AlCl$_3$ to 1.71 mol and that of HCl to 0.989 mol. The Al/total Fe ratio accordingly corresponds to 12.3 mol % relative to total Fe. This solution is heated to 34° C. with agitation and with nitrogen supplied at 300 Nl/h. When this temperature has been reached 1615 ml of soda lye containing 300 g NaOH/l (corresponding to 7.5 equivalents per liter) is pumped in with a gear pump in 6 minutes. 33.8% of the metals Fe+Al are therefore precipitated by the NaOH. As soon as the precipitation is over the supply of nitrogen is stopped and air is supplied at 97 Nl/h. The reaction is terminated 180 minutes after the beginning of oxidation. The oxidation speed is accordingly 33.3 mol % Fe (11)/h. (This takes into account only the 33.8% of the Fe which was precipitated by the NaOH. The Fe (III) part is counted as Fe (II). It is also assumed that Fe and Al were precipitated equally).

The nucleus had the following properties:
BET surface area: 173 m$^2$/g
Crystallite size: 17.5 nm
AR: 3027

Comparative Example 2

Aluminium-containing Nucleus of FeCl$_2$ and AlCl$_3$ 11.58 liters of FeCl$_2$ solution with 55.09 g/l Fe and an Fe (III) content of 1.0 mol % (relative to total Fe) is placed in a discontinuous agitating boiler with a useful volume of 30 liter, equipped with a three-stage cross-arm agitator and a gas supply device (a ring with holes below the agitator). 818 g of AlCl$_3$ solution with 6.00% by weight of Al and 1.6% of HCl is then added.

The quantity of FeCl$_2$ corresponds to 9.5 mol Fe (Fe (II) and Fe (III)), the quantity of AlCl$_3$ to 1.82 mol and that of HCl to 0.36 mol. The Al/total Fe ratio accordingly corresponds to 19.2 mol % relative to total Fe. This solution is heated to 44° C. with agitation and with nitrogen supplied at 300 Nl/h. When this temperature has been reached 1061 ml of soda lye containing 300 g NaOH/l (corresponding to 7.5 equivalents per liter) is pumped in with a gear pump in 10 minutes. 32.1% of the metals Fe+Al are therefore precipitated by the NaOH. As soon as the precipitation is over the supply of nitrogen is stopped and air is supplied at 67 Nl/h. The reaction is terminated 135 minutes after the beginning of oxidation. The oxidation speed is accordingly 44.5 mol % Fe (11)/h. (This takes into account only the 32.1% of the Fe which was precipitated by the NaOH. The Fe (III) part is counted as Fe (II). It is also assumed that Fe and Al were precipitated equally).

The nucleus had the following properties:
BET surface area: 186 m$^2$/g
Crystallite size: 15.5 nm
AR: 2883

Example 4

Preparation of Yellow Pigment 2 mol of yellow nucleus suspension from Example 1 (counted as mmols of α-FeOOH) and 20 mol FeCl$_2$ with an Fe content of 95.7 g/l Fe are placed in a discontinuous agitating boiler with a gas supply ring, a pH meter, temperature control and a three-stage cross-arm agitator. The suspension is heated to 60° C. with constant agitation. When that temperature is reached a pH level of 3.4 is maintained by constant metered addition of soda lye. 76 Nl/h of air is fed in simultaneously. When the air has been fed in for 1618 minutes all the Fe (II) is oxidized, representing an oxidation speed of 3.7 mol % Fe/h.

The yellow pigment produced has the following properties:

| | |
|---|---|
| BET surface area: | 32.7 m$^2$/g |
| Crystallite size: | 27 nm |
| Color intensity (against Bayferrox ® 915): | 97% |
| da*: | 0.2 |
| db*: | −1.2 |
| dL* (against Bayferrox 915): | −0.7 |
| da*: | 0.7 |
| db*: | −1.2 |

Example 5

Preparation of Yellow Pigment

If the nucleus from Example 2 is used instead of the nucleus from Example 1 and the quantity of air is set to 76 Nl/h, with the reaction conditions otherwise identical, a yellow pigment with the following properties is obtained after 1618 minutes (oxidation speed 3.7 mol %/h):

| | |
|---|---|
| BET surface area: | 45.6 m$^2$/g |
| Crystallite size: | 25 nm |
| Color intensity (against Bayferrox 915): | 97% |
| da*: | 0.1 |
| db*: | −2.6 |
| dL* (against Bayferrox 915): | −3.4 |
| da*: | 1.1 |
| db*: | −4.0 |

Example 6

Preparation of Yellow Pigment

If the nucleus from Example 3 is used instead of that from Example 1 the following yellow pigment is obtained under the reaction conditions of Example 5:

| | |
|---|---|
| BET surface area: | 32.7 m$^2$/g |
| Crystallite size: | 32 nm |
| Color intensity (against Bayferrox 915): | 101% |
| da*: | −0.9 |
| db*: | −2.1 |
| dL* (against Bayferrox 915): | −2.4 |
| da*: | −1.0 |
| db*: | −4.0 |

Only the pigment prepared with a nucleus according to the invention is similar enough in color to the comparative type Bayferrox 915 to be utilisable as a high-grade yellow pigment. The two yellow pigments prepared from the nuclei in the comparative examples are considerably too dark (the pure shade) and not yellow enough.

What is claimed is:

1. A method of preparing aluminium-containing iron oxide nuclei with an (α-FeOOH crystal structure with an aspect ratio (AR) of 2100 to 3600 and a BET surface area of 50 to 150 m2/g using FeCl$_2$, comprising the steps of
    a) initially adding 4–13 mol %, based on the total iron, of an Al component to an iron (II) chloride solution with a total Fe content of 20–100 g/l, and an Fe (III) content of 0.1 to 10 mol % Fe (III) (based on the total Fe)
    b) heating the mixture to a precipitation temperature between 30 and 60° C.,
    c) adding a precipitating agent with an active ingredient content of 2–10 equivalents per liter, to the mixture and the molar ratio of Fe+Al to precipitating agent is 20–80% of the stoichiometric quantity,
    d) oxidizing the precipitated suspension by an oxidant at a speed such that the oxidation rate is 2–50 mol %/h of the iron to be oxidized.

2. The method of claim 1, wherein a) the total Fe content is 40–65 g/l.

3. The method of claim 1, wherein b) the precipitation temperature is between 35 and 50° C.

4. The method of claim 1, wherein c) the precipitating agent has an active ingredient content of 4–8 equivalents per liter.

5. The method of claim 1, wherein c) the molar ratio of Fe+Al to precipitating agent is 30–60% of the stoichiometric quantity.

6. The method of claim 1, wherein (1) the oxidation rate is 10–35 mol %/h of the iron to be oxidized.

7. The method of claim 1, wherein the Al component is aluminium chloride.

8. The method of claim 1, wherein the precipitating agent is an aqueous solution or an aqueous slurry of NaOH, KOH, Na$_2$CO$_3$, K$_2$CO$_3$, Mg(OH)$_2$, MgO, MgCO$_3$, Ca(OH)$_2$, CaO, CaCO$_3$, NH$_3$, a secondary amine, or a tertiary aliphatic amine.

9. The method of claim 1, wherein the oxidant is atmospheric oxygen, oxygen, ozone, H$_2$O$_2$, chlorine, a nitrate of the alkali metals or alkaline earth metals, or NH$_4$NO$_3$.

10. The method of claim 1, wherein the reaction takes place in discontinuous or continuous agitating boilers, in cascades of agitating boilers, loop-type reactors or reactors without agitators and with dual-material nozzles as mixing members.

11. A method of preparing a yellow pigment using the α-FeOOH nuclei prepared according to the process of claim 1.

* * * * *